Feb. 17, 1959 J. A. ABBOTT 2,873,775
SAW CHAINS
Original Filed July 7, 1950 2 Sheets-Sheet 1
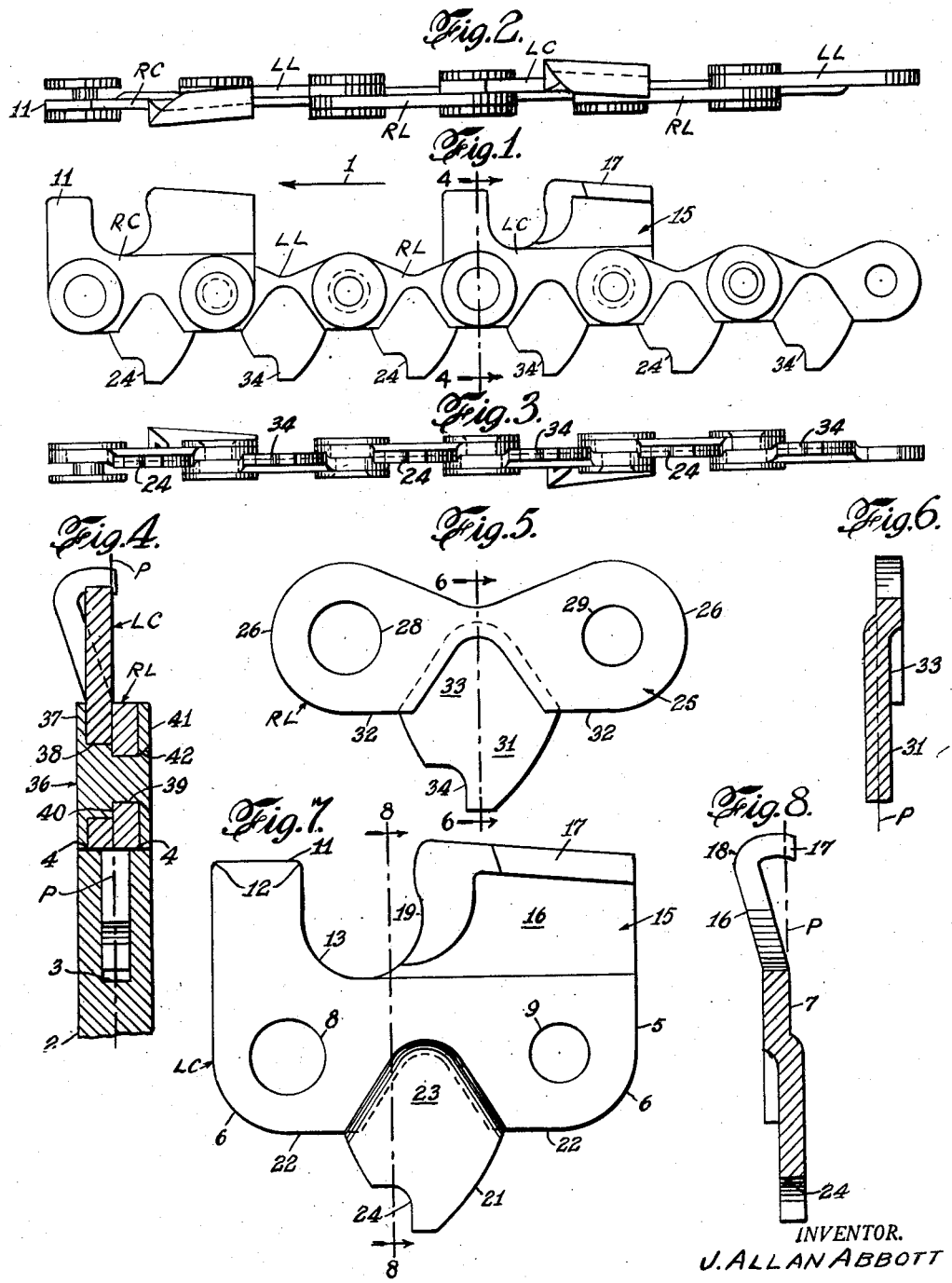
INVENTOR.
J. ALLAN ABBOTT
BY
ATTORNEY.

Feb. 17, 1959        J. A. ABBOTT        2,873,775
SAW CHAINS
Original Filed July 7, 1950        2 Sheets-Sheet 2
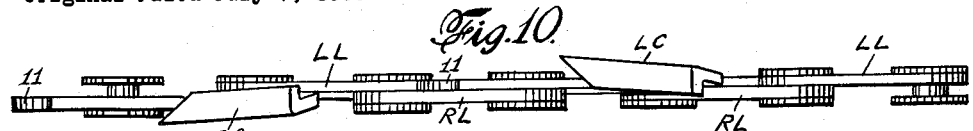
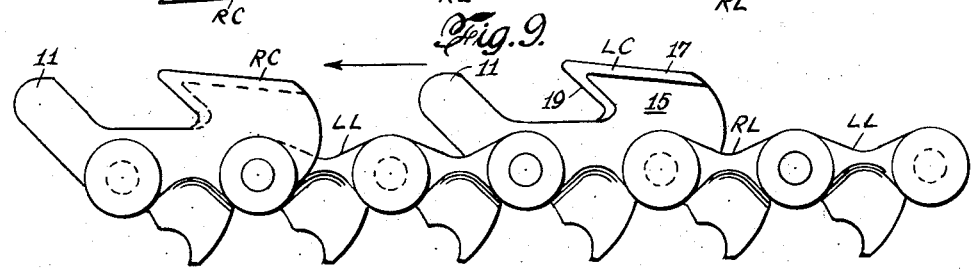
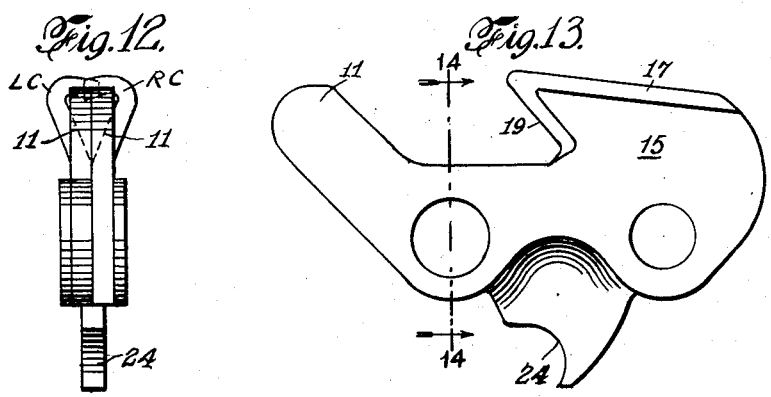
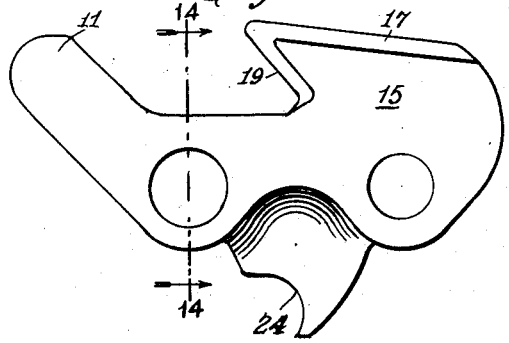
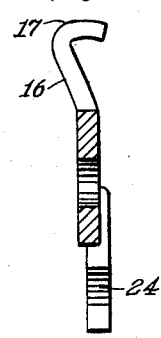
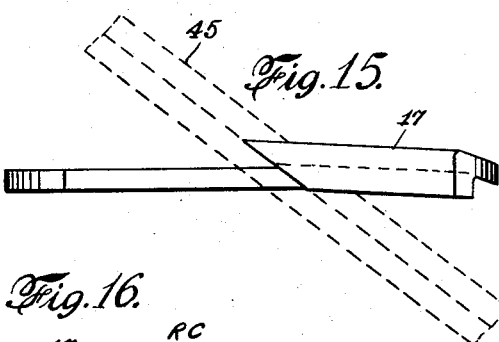
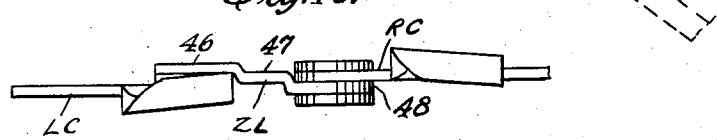
INVENTOR.
J. ALLAN ABBOTT
BY
ATTORNEY.

United States Patent Office 2,873,775
Patented Feb. 17, 1959

2,873,775
SAW CHAINS

John Allan Abbott, Stamford, Conn., assignor to Textron, Inc., Providence, R. I., a corporation of Rhode Island Continuation of application Serial No. 172,488, July 7, 1950. This application August 6, 1956, Serial No. 602,213

17 Claims. (Cl. 143—135)

This is a continuation of my prior application Serial No. 172,488 filed July 7, 1950 (now abandoned) and relates to cutting chains for power chain saws. Such chains are formed of a plurality of links pivotally connected together and adapted to run on a slotted guide bar, for example a guide bar of the "beaver tail" type, and to be driven by a sprocket wheel associated with the guide bar.

It is an object of the present invention to provide a saw chain that is light in weight, economical to manufacture and easy to maintain in operative condition. Other advantages of the saw chain in accordance with the invention are that it cuts a narrow kerf and is especially fast cutting with an unusually high ratio between the cutting speed and the power required to drive the chain.

Still other advantages will be apparent from the following description of the preferred embodiments of my invention that are illustrated by way of example in the accompanying drawings in which:

Fig. 1 is a side elevation of a typical sequence or series of saw chain links embodying the present invention.

Fig. 2 is a top plan view of the links shown in Fig. 1.

Fig. 3 is a bottom view of the links.

Fig. 4 is an enlarged cross-section on the line 4—4 in Fig. 1 with the addition of a fragmentary cross-sectional showing of the guide bar on which the chain runs.

Fig. 5 is a side elevation of one of the connecting links.

Fig. 6 is a cross-section on the line 6—6 of Fig. 5.

Fig. 7 is a side elevation of one of the cutter links.

Fig. 8 is a section on the line 8—8 in Fig. 7.

Fig. 9 is a side elevation of a typical series or sequence of links of another embodiment of the invention.

Fig. 10 is a top view of the chain section shown in Fig. 9.

Fig. 11 is a bottom view.

Fig. 12 is an enlarged end view.

Fig. 13 is a side view of one of the cutter links.

Fig. 14 is a cross-section taken on the line 14—14 in Fig. 13.

Fig. 15 is a top view of the link shown in Fig. 13 with a diagrammatic representation of a flat file in position to sharpen the cutting tooth.

Fig. 16 is a top view of a section of chain illustrating an alternative manner in which the links can be connected.

The saw chain in accordance with the present invention is adapted to run on the slotted guide bar of a power chain saw and comprises a series of links which are pivotally connected together to form an articulated chain structure. The links are arranged in predetermined sequence. This sequence is repeated to form a chain of the desired length for the guide bar of the chain saw on which it is to be used and the end links of the chain are then pivotally connected to form an endless structure.

A typical sequence of chain links in accordance with the invention is illustrated in Figs. 1, 2 and 3 of the drawings. This sequence comprises a right hand cutter link RC, a left hand connecting link LL, a right hand connecting link RL, a left hand cutter link LC, a right hand connecting link RL and a left hand connecting link LL. The direction of movement of the chain is indicated by the arrow 1. As illustrated in Fig. 4, the chain is adapted to run on a guide bar 2 having a slot 3 which extends along the edge of the guide bar and spaced guiding faces 4 on opposite sides of the slot.

One of the left hand cutter links LC is illustrated on a larger scale in Figs. 7 and 8. The link is of substantially uniform thickness, being preferably stamped from suitable sheet metal or strip stock. The body portion 5 of the link has rounded lower corners 6 and is substantially flat, with its inner face 7 disposed in a median plane P which bisects the chain when the links are assembled. The position of the median plane P in the assembled saw and its relation to the guide bar 2 are illustrated in Fig. 4. It will be seen that the plane P is parallel to the guide bar and bisects the slot 3 formed in the edge of the guide bar. Perforations 8 and 9 are provided near the front and rear ends of the link. Perforation 8 is larger than perforation 9.

At the front end of the link, there is provided an upwardly projecting depth gauge portion 11 which is shown as being in the same plane as the body portion 5 but may alternatively be bent or offset slightly to one side or the other. The upward corners of the depth gauge portion 11 are preferably rounded, as indicated at 12, and the rear edge of the depth gauge portion joins the upper edge of the body portion in a radius or fillet 13.

A cutting tooth 15 projects upwardly from the rear portion of the link and comprises a shank portion 16 and toe portion 17. The shank portion 16 of the tooth curves or slopes upwardly and outwardly away from the plane P, as clearly shown in Fig. 8. At its outer or upper end, the shank portion 16 is joined by a curve 18 with the curved toe portion 17 which extends into the median plane P and preferably somewhat past this plane. In the form of tooth shown in Fig. 8, the radius of curvature of the toe portion 17 in cross-section is approximately twice that of the curve 18 which joins the toe portion 17 with the shank 16. As will be seen in Fig. 2, the tooth 15 is disposed at an angle to the longitudinal axis of the chain—and hence to the median plane P—the front end of the tooth being disposed farther out from the plane P than the rear end. The top of the tooth also slopes downwardly from front to rear, as shown in Fig. 1. The front edge of the tooth, including the front edge of the shank portion 16 and the front edge of the toe portion 17, is sharpened by being bevelled inwardly and downwardly at an angle to the plane P and to a horizontal plane perpendicular to plane P. The sharpening of the tooth is readily effected by means of a conical or cylindrical file or grinder. The bevelled surface of the sharpened front edge of the tooth will accordingly be cylindrical or conical, the axis of the cylinder or cone being inclined both to the horizontal and the vertical.

In a preferred form of the invention, the toe portion of the tooth is slightly tapered, being narrower at the rear than at the front. For example, the inner edge of the toe portion can be substantially parallel with the plane P while the outer edge is inclined to this plane as described above.

A driving lug 21 projects downwardly below the lower edges 22 of the link (Fig. 7) and is adapted to be received in the slot 3 of the guide bar 2 while the lower edges 22 slide on the guiding faces 4 (Fig. 4). The driving lug 21 is offset approximately half the thickness of the metal from the plane of the body portion 5 so that the driving lug is disposed approximately equally on the opposite sides of the median plane P (Fig. 8). The driving lug has a root portion 23 which extends up into the body portion 5 so that the general shape of the driving lug, including the root portion, is trapezoidal. The front and rear edges of the downwardly projecting portion of the driving lug 21 are convexly curved, except for a notch 24 that is cut out of the lower portion of the forward edge. Preferably, the driving lug 21 is disposed approximately midway between the front and rear ends of the link.

The right hand cutter link is the same as the left hand cutter link shown in Figs. 7 and 8 and described above, except that it is reversed, being a mirror image of the left hand link. In the assembled saw chain, the inner face of the body portion of the right hand cutter link lies in the median plane P while the driving lug portion is centered with respect to plane P and is hence in line with the driving portions of the right hand cutter links. As viewed from the front end of a right hand cutter link, the tooth portion projects upwardly and to the right from the median plane P and then inwardly to, and preferably slightly beyond, this plane to form the toe portion of the tooth. While the right hand and left hand cutter links are preferably identical except for being oppositely disposed, thereby permitting the use of the same blanking dies in punching out the tooth blanks from the stock, arbitrary differences in the teeth can, of course, be made. It is therefore to be understood that, in stating that the cutter links are alike but oppositely disposed, it is meant that the links are either identical or similar except that the right and left hand links are reversed with respect to the median plane P.

A right hand intermediate or connecting link RL is shown by way of example in Figs. 5 and 6. The connecting link RL is essentially the same as a cutter link except that the depth gauge portion 11 and tooth 15 are omitted. It has a body portion 25 with rounded ends 26. The body portion 25 is substantially flat and its inner face lies in the median plane P when the chain is assembled. Perforations 28 and 29 are provided near the ends of the link, the perforation 28 being larger than perforation 29. The link has a driving lug portion 31 which projects downwardly beyond the lower edges 32 of the body portion and has a root portion 33. The driving lug, including the root portion 33, is offset with respect to the plane of the body portion 25 so that in the assembled chain the driving lug portion is substantially centered with respect to the median plane P and is hence in line with the driving lug portions of the other links. The lower portion of the front edge of the driving lug is notched, as indicated at 34.

The left hand intermediate or connecting links LL are identical with the right hand links RL except that the driving lug portion 31 is offset in the opposite direction so that the right hand link and left hand link are symmetrical with one another relative to the median plane P. Hence, as viewed from the front, the body portion of a left hand link LL lies to the left of the median plane P with the inner face of the body portion in said plane.

The relation of the links to one another in the assembled chain is illustrated in Figs. 1, 2 and 3. It will be seen that the rear end of a right hand link—whether "cutter" or plain—overlaps, and is pivotally connected to, the forward end of a left hand link, the rear end of which in turn overlaps, and is pivotally connected to, the front end of a right hand link. In the embodiment of the invention shown by way of example in the drawings, the chain is formed solely of right and left links disposed alternately on opposite sides of the median plane P with the inner faces of all of the links lying substantially in said plane. As the chain thus has a minimum thickness, it cuts an unusually narrow kerf, thereby wasting less wood in the form of sawdust and requiring correspondingly less power to drive it. The two-tier chain shown in the drawings is also of lighter weight and requires less metal, the thickness of the stock used being the same as that used in the conventional three-tier chain. Each cutter link has only a single cutting tooth and there are only two basic kinds of links, namely a cutter link and a plain or connecting link. Hence, only two sets of blanking dies are required in the manufacture of the chain shown in the drawings, namely a set of dies for the cutting links and another set for the plain links.

The pivotal connection between successive links is provided by a pivot pin or rivet 36. The pivot pin 36 has an enlarged head 37 and a stepped shank portion comprising a larger portion 38 and a smaller portion 39 separated by an annular shoulder 40. The larger shank portion 38 fits in the larger holes 8, 28 of the links while the smaller shank portion 39 fits in the smaller holes 9, 29. The enlarged head 37 engages the outer face of the pivotal portion of the adjacent link. At the other end of the pin, there is a washer 41 having a countersunk hole 42 through which the end of the pin extends. In assembling the chain, the pin is inserted in the aligned holes of successive links and the washer 41 is placed over the end of the pin which is then swaged or riveted in the countersunk hole of the washer so as to be substantially flush. One of the links is thereby held securely between the washer 41 and the shoulder 40 of the pivot pin. This normally holds the pivot pin against rotation. The other link is disposed between the first mentioned link and the enlarged head 37 of the pivot pin. The spacing of the shoulder 40 from the head 37 of the pivot pin is such that the latter link is snugly held but is free to pivot on the enlarged shank portion of the pivot pin so that there is free pivotal movement between successive links.

The washer 41 and the head 37 of the pivot pin 36 are of such size that their lower edges are flush with, or slightly lower than, the lower edges 22 and 32 of the links and bear on the guiding faces 4 of the opposite sides of the slot 3 of the guide bar so as to provide additional bearing surface for the chain on the guide bar. Preferably, the head of the pivot pin and the washer are sufficiently hardened to have good wearing properties while at least the end of the shank portion of the pivot pin is sufficiently soft to permit riveting.

Except for the differences illustrated in the drawings and those pointed out below, the chain shown in Figs. 9 to 15 is basically the same as that of Figs. 1 to 8 and corresponding parts are designated with the same reference numerals to avoid repetition of description. One of the important differences between the two embodiments is that, in the form shown in Figs. 9 to 15, the front edge of the tooth 15, including both the shank portion and the toe portion of the tooth, is sharpened by bevelling the edge in a plane which is inclined at an acute angle to the aforementioned median plane P and also at an angle to a horizontal plane which is perpendicular to the median plane P and passes through the axes of the pivot pins 36. The angle of inclination is preferably 40° to 60° in each instance. The bevelled surface of the toe portion 17 of the tooth lies in the same plane as the bevelled surface of the shank portion 16. Hence the whole tooth, including both the shank portion 16 and the toe portion 17, can be sharpened simultaneously by means of a flat file or grinding tool held at approximately the proper angle. In Fig. 15, a flat file 45 in correct position for sharpening the tooth is shown schematically in dotted lines. As flat files are readily obtainable and are easily used, the provision of a tooth form that can be sharpened with a flat file is a distinct advantage, particularly in view of the fact that chain saws are most frequently used in locations away from urban areas.

A further feature of the chain shown in Figs. 9 to 15 is that the depth gauge portion 11 of the cutter link projects forwardly so that its upper end is a substantial distance ahead of the front pivot hole of the link. As will be seen from Fig. 13, the depth gauge portion 11 is approximately parallel to the front edge 19 of the tooth. This arrangement of the depth gauge portion gives greater freedom in sharpening the tooth and more room for chips produced by the cutting tooth. It also moves the bearing point of the depth gauge portion on the saw cut ahead so that the depth gauge portion has, in effect, a longer lever arm and hence a greater mechanical advantage in guiding and controlling the cutting tooth.

In addition to the differences pointed out above, it will be seen that the shape of the links of the chain shown in Figs. 9 to 15 is somewhat different from that of the chain shown in Figs. 1 to 8. Otherwise, the two embodiments are essentially the same.

While the drawings illustrate preferred embodiments of the present invention, it will be understood by those skilled in the art that various modifications may be made. Thus, for example, the spacing of the cutter links of the chain may be increased by inserting additional plain links between them. Alternatively, the cutter links may be brought closer together. Thus, a right hand cutter link may be pivotally connected to the rear end of a left hand cutter link, in which event the depth gauge portion of the rear link is preferably omitted. An intermediate spacing may be obtained by using a connecting link of the form shown in Fig. 16 between successive cutter links. The connecting link ZL is similar to that shown in Fig. 5 except that the front edge portion 46 that is pivotally connected to a left hand cutter link LC is offset in one direction from a central portion 47 that carries the driving lug while the rear end portion 48 that is pivotally connected to a right hand cutter link RC is offset in the opposite direction from said middle portion 47. Hence, the inner faces of the front and rear pivotal portions 46 and 48 are in the above mentioned median plane P while the outer faces of said portions are on opposite sides of said plane. The middle portion 47, together with the driving lug that projects downwardly from it, is substantially centered with respect to said median plane so that the driving lug is in line with those of the right and left hand cutter links. While driving lugs are preferably provided on all of the links, as shown in the drawings, selected lugs, for example every other lug, can be omitted if the driving sprocket is of such form as to drive the chain with fewer lugs. Certain of the depth gauge portions may also be omitted, as for example where one cutter link is pivoted directly to a preceding cutter link. Alternatively, some or all of the depth gauge portions can be provided on a preceding tooth, for example on one of the connecting links LL or RL instead of on the front edge of the cutter tooth. Moreover, it will be understood that the individual features of the several embodiments illustrated in the drawings are mutually interchangeable with one another and that other alterations and modifications in the structure or arrangement of the links may be made within the scope of the appended claims.

What I claim and desire to secure by Letters Patent is:

1. A saw chain adapted to run on a guide bar having a slot extending along its edge and spaced guiding faces on opposite sides of said slot and composed solely of right and left links disposed alternately on opposite sides of a median plane parallel with the guide bar in predetermined sequences, each sequence comprising a right hand cutter link having an inner face lying in said median plane, a bottom edge surface adapted to slide on one of said guide faces and a tooth portion projecting outwardly and away from said plane and then inwardly to said plane at its outer end, and a left hand cutter link having an inner face lying in the same median plane, a bottom edge surface adapted to slide on the opposite guide face and a tooth portion projecting upwardly and away from said plane on the opposite side from the tooth portion of the right hand cutter and then inwardly to said plane at its outer end, the front edges of the tooth portions being sharpened, and the end portions of each link being perforated, the links of the chain being arranged with the rear end of each single link overlapping the front end of the next succeeding single link only and at least certain links having offset driving lugs projecting downward below said bottom edge portions and entering the slot between the guiding faces, and pivot pins extending through the overlapped perforated ends of the links to connect the links pivotally together, said pins having enlarged head portions extending to the lower edges of the links and adapted to bear on the said guiding faces of the guide bar.

2. A saw chain adapted to run on a guide bar having a slot extending along its edge and spaced guiding faces on opposite sides of said slot and composed solely of right and left links having perforated end portions and arranged in predetermined sequence with the rear end of each link overlapping the front end of a single succeeding link only each link sequence comprising a right hand cutter link having an inner face lying in a median plane parallel with the guide bar, a bottom edge surface adapted to slide on one of said guide faces and a tooth portion projecting upwardly and away from said plane and then inwardly to said plane at its outer end and a left hand cutter link having an inner face lying in the same median plane, a bottom edge surface adapted to slide on the opposite guide face and a tooth portion projecting upwardly and away from said plane on the opposite side from the tooth portion of the right hand cutter and then inwardly to said plane at its outer end, at least certain links having offset driving lugs projecting downward below said bottom edge portions and entering the slot between the guiding faces, pivot pins connecting the overlapped perforated ends of the links, each of said pins having a head at one end bearing against the outer face of one of the links and a countersunk washer bearing against the opposite side of the overlapping link and fitting over the pin, the end of the pin being riveted in the countersunk hole of the washer, said heads and washers extending to the lower edges of the links and being adapted to bear on the guiding faces of the guide bar.

3. A saw chain adapted to run on a guide bar having a slot extending along its edge and spaced guiding faces on opposite sides of said slot, said chain being composed solely of right and left links having perforated end portions and arranged in predetermined sequences with the rear end of each link overlapping the front end of a single succeeding link so that the chain has a thickness of two links, said links having bottom edge surfaces adapted to slide on said guiding faces and driving lugs which are offset with respect to the plane of the links and project down into the slot of the guide bar and selected ones of said links having outwardly projecting saw teeth, pivot pins connecting the overlapped perforated ends of the links, each of said pins having a head at one end bearing against the outer face of one of the links, and a countersunk washer bearing against the opposite side of the overlapping link and fitting over the pin, the end of the pin being riveted in the countersunk hole of the washer, said heads and washers extending to the lower edges of the links and being adapted to bear on the guiding faces of the guide bar to provide additional bearing surface.

4. A saw chain adapted to run on a guide bar having a slot extending along its edge and spaced guiding faces on opposite sides of said slot, said chain being composed of a series of single links having perforated end portions and arranged with the rear end portion of each link overlapping the front end portion of a single succeeding link so that the chain has a thickness of two links, said links having bottom edge surfaces adapted to slide on said guiding faces and driving lugs which are offset with respect to the plane of the links and project down into the slot of the guide bar and selected ones of said links having outwardly projecting saw teeth, pivot pins extending through the overlapped perforated end portions of the links to connect them pivotally together, said pins having enlarged head portions extending to the lower edges of the links and adapted to bear on the said guiding faces of the guide bar to provide additional bearing surface.

5. A saw chain adapted to run on a guide bar having a slot extending along its edge and spaced guiding faces on opposite sides of said slot, said chain being composed solely of right and left links disposed alternately on opposite sides of a median plane parallel with the guide bar and arranged in predetermined sequences with the rear end of each link overlapping, and pivotally connected to, the front end of a single succeeding link only, each sequence comprising a right hand cutter link having an inner face lying in said median plane, a bottom edge surface adapted to slide on one of said guide strips, an upwardly projecting depth gauge portion at the forward end of said link, a tooth portion at the rear end of said link projecting upwardly and outwardly away from said plane and then inwardly to said plane at its outer end, the front edges of said tooth portion being sharpened, and a downwardly projecting driving lug portion disposed intermediate the ends of the link, said lug being offset so as to be substantially centered with respect to said median plane and being adapted to project down into the slot of the guide bar, and a left hand cutter link like said right hand cutter link but oppositely disposed relative to said median plane with an inner face in said plane and with a driving lug portion in line with the driving lug portion of the right hand cutter link.

6. A saw chain adapted to run on a guide bar having a slot extending along its edge and spaced guiding faces on opposite sides of said slot, said chain being composed solely of right and left links disposed alternately on opposite sides of a median plane parallel with the guide bar and arranged in predetermined sequences with the rear end of each link overlapping, and pivotally connected to, the front end of a single succeeding link only, each sequence comprising a right hand cutter link having an inner face lying in said median plane, a bottom edge surface adapted to slide on one of said guide faces, a depth gauge portion projecting upwardly and forwardly at the front end of the link, a cutting tooth at the rear end of said link having a shank portion projecting upwardly and outwardly away from said plane and a toe portion projecting inwardly toward said plane at the outer end of the shank portion, the front edge of the tooth being bevelled in a single plane forming an acute angle with the outer and upper faces of the tooth whereby the edges of the shank and toe portions can be sharpened by an abrasive tool having a flat face which engages the bevelled surfaces of both of said portions simultaneously, and a downwardly projecting driving lug portion disposed intermediate the ends of the link, said lug being offset so as to be substantially centered with respect to said median plane and being adapted to project down into the slot of the guide bar, and a left hand cutter link like said right hand cutter link but oppositely disposed relative to said median plane with an inner face in said plane and with a driving lug portion in line with the driving lug portion of the right hand cutter link.

7. A saw chain adapted to run on a guide bar having a slot extending along its edge and spaced guiding faces on opposite sides of said slot, said chain being composed solely of right and left links disposed alternately on opposite sides of a median plane parallel with the guide bar and arranged in predetermined sequences with the rear end of each link overlapping, and pivotally connected to, the front end of a single succeeding link so that the chain has a thickness of two links, each sequence comprising a right hand cutter link having an inner face lying in said median plane, and a cutting tooth having a shank portion projecting upwardly and outwardly away from said plane and a toe portion extending inwardly toward said plane from the outer end of the shank portion, the front edge of the tooth being bevelled in a single plane forming an acute angle with the outer face of the shank portion and with the upper face of the toe portion, whereby the front edges of the shank and toe portions can be sharpened by an abrasive tool having a flat face which engages the bevelled surfaces of both of said portions simultaneously, and a left hand cutter link like said right hand cutter link but oppositely disposed relative to said median plane, with an inner face in said plane.

8. A saw chain link comprising a body portion and an integral cutting tooth having a shank portion which projects upwardly, forwardly and outwardly from the plane of the body portion and a toe portion which projects inwardly toward said plane from the outer end of the shank portion, the front edge of the tooth extending forwardly and inwardly from the body portion and then rearwardly and inwardly toward said plane and being bevelled in a single plane forming an acute angle with the outer face of the shank portion and with the upper face of the toe portion, whereby the front edges of the shank and toe portions can be sharpened by an abrasive tool having a flat face which engages the bevelled surfaces of both of said portions simultaneously.

9. A saw chain link comprising a body portion, a depth gauge portion projecting upwardly at the front end of the link and an integral cutting tooth at the rear end of the link having a shank portion which projects upwardly, forwardly and outwardly from the plane of the body portion and a toe portion which projects inwardly toward said plane from the outer end of the shank portion, the front edge of the tooth extending forwardly and upwardly from the body portion and then rearwardly and inwardly toward said plane and being bevelled in a single plane forming an acute angle with the outer face of the shank portion and with the upper face of the toe portion, whereby the front edges of the shank and toe portions can be sharpened by an abrasive tool having a flat face which engages the bevelled surfaces of both of said portions simultaneously.

10. A saw chain link comprising a body portion, a depth gauge portion projecting upwardly and forwardly at the front end of the link and an integral cutting tooth at the rear end of the link having a shank portion which projects upwardly, forwardly and outwardly from the plane of the body portion and a toe portion which projects inwardly toward said plane from the outer end of the shank portion, the front edge of the tooth extending forwardly and upwardly from the body portion and then rearwardly and inwardly toward said plane and being bevelled in a single plane forming an acute angle with the outer face of the shank portion and with the upper face of the toe portion, whereby the front edges of the shank and toe portions can be sharpened by an abrasive tool having a flat face which engages the bevelled surfaces of both of said portions simultaneously.

11. A saw chain adapted to run on a guide bar having a slot extending along its edge and guiding faces on opposite sides of said slot and composed solely of right and left links disposed alternately on opposite sides of a median plane parallel with the guide bar in predetermined sequences, each sequence comprising a right hand cutter link having an inner face lying in said median plane and a tooth portion projecting upwardly and outwardly from said plane and then inwardly to said plane at its outer end, a left hand connecting link disposed on the opposite side of said median plane and having an inner face lying in said plane, a right hand connecting link lying on the opposite side of the median plane from the left hand connecting link and having an inner face lying in said plane, said connecting links being free of tooth portions, and a left hand cutter link disposed on the opposite side of the median plane from the right hand cutter link and having an inner face lying in said median plane and a tooth portion projecting upwardly and away from said plane and then inwardly to said plane at its outer end, at least certain of said links having downwardly projecting offset driving lug portions all of which are disposed in line with one another and are adapted to project into the slot of the guide bar.

12. A saw chain adapted to run on a slotted guide bar and comprising a plurality of links arranged in predetermined sequence alternately on opposite sides of a median plane parallel to the guide bar and pivot pins connecting successive links together, each sequence comprising a right hand cutter link having an inner face lying in said median plane, an upwardly projecting depth gauge portion at the forward end of said link and a tooth portion at the rear end of said link projecting upwardly and away from said plane and then inwardly to said plane at its outer end, a left hand connecting link disposed on the opposite side of said median plane with its inner face lying in said plane and its front end connected solely to the rear end of said right hand cutter link, a right hand connecting link lying on the opposite side of the median plane from said left hand connecting link with its inner face lying in said plane and its forward end connected solely to the rear end of said left hand connecting link and a left hand cutter link disposed on the opposite side of the median plane from the right hand connecting link and having an inner face lying in said plane, an upwardly projecting depth gauge portion at the forward end of said link and a tooth portion at the rear end of said link projecting upwardly and away from said plane and then inwardly to said plane at its outer end, the forward end of said left hand cutter link being connected solely to the rear end of said right hand connecting link and at least certain of said links having downwardly projecting driving lug portions which are adapted to be received in the slot of the guide bar.

13. A saw chain adapted to run on a guide bar having having a slot extending along its edge and spaced guiding faces on opposite sides of said slot, said chain being composed of a series of single links and means for pivotally connecting the front end of each link to the rear end of a single preceding link, said links comprising right hand links and left hand links disposed on opposite sides of a median plane parallel with the guide bar with the inner faces of said links lying substantially in said plane, said links having bottom edge surfaces adapted to slide on said guiding faces and at least certain links having driving lugs projecting downwardly below said bottom edge portions, said driving lugs being offset from the inner faces of said links and substantially centered with respect to said median plane and being adapted to project into said slot of the guide bar, at least certain of said links having outwardly projecting saw teeth.

14. A saw chain adapted to run on a guide bar having a slot extending along its edge and spaced guiding faces on opposite sides of said slot, said slot having a median plane parallel to the sides of the slot, said chain being composed of a series of links and means for pivotally connecting successive links, said links comprising right hand cutter links and left hand cutter links disposed on opposite sides of said median plane, each of said cutter links having a body portion disposed substantially parallel to said median plane, an upwardly projecting depth gauge portion at the forward end of said link and a tooth portion at the rear end of said link, said tooth portion projecting upwardly from said body portion and away from said median plane and then inwardly at least to said median plane, said link further having a lower edge portion adapted to engage and slide on one of said guiding faces, and a driving lug portion which projects downwardly beyond said lower edge portion and is adapted to be received in and slide in said slot, said driving lug portion being disposed intermediate the ends of the link and being offset inwardly from said body portion so that its median plane substantially coincides with the median plane of said slot.

15. A saw chain adapted to run on a guide bar having a slot extending along its edge and spaced guiding faces on opposite sides of said slot, said chain being composed of a series of links and means for pivotally connecting successive links, said links comprising right hand links and left hand links disposed on opposite sides of a median plane parallel with the guide bar, each of said links having forward and rear portions in the same plane with one another and parallel to said median plane, said forward and rear portions having bottom edge surfaces adapted to slide on said guiding faces and at least certain links having driving lugs disposed intermediate said forward and rear portions and projecting downwardly below said bottom edge surfaces, said driving lugs being offset from the plane of said forward and rear portions and substantially centered with respect to said median plane and being adapted to project into said slot of the guide bar, at least certain of said links having outwardly projecting tooth portions.

16. A saw chain adapted to run on a guide bar having a slot extending along its edge and spaced guiding faces on opposite sides of said slot, said slot having a median plane parallel the sides of the slot, said chain being composed of a series of links and means for pivotally connecting successive links, said links comprising right and left cutter links disposed respectively on opposite sides of said median plane, each of said links having forward and rear portions disposed in the same plane with one another and parallel to said median plane, a depth gauge portion projecting upwardly from said forward portion and a tooth portion projecting upwardly from said rear portion, said forward and rear portions having lower edge surfaces adapted to slide on said guiding faces, and said link further having a driving lug portion disposed intermediate said forward and rear portions and projecting downwardly below said bottom edge surfaces, said driving lugs being offset from the plane of said forward and rear portions and substantially centered with respect to said median plane and being adapted to project into said slot of the guide bar.

17. A saw chain adapted to run on a guide bar having a slot extending along its edge and spaced guiding faces on opposite sides of said slot, said slot having a median plane parallel the sides of the slot, said chain being composed of a series of links and means for pivotally connecting successive links, said links comprising right and left cutter links disposed respectively on opposite sides of said median plane, each of said links having forward and rear portions disposed in the same plane with one another and parallel to said median plane, and an intermediate portion disposed parallel to but offset inwardly from said forward and rear portions so as to be substantially centered with respect to said median plane, said forward and rear portions having lower edge surfaces adapted to slide on said guiding faces, a depth gauge portion projecting upwardly from said forward portion, a tooth portion projecting upwardly from said rear portion and a driving lug portion projecting downwardly from said intermediate portion and in the same plane therewith, said driving lug portion extending below said lower edge surfaces and being adapted to be received in said slot of the guide bar.

References Cited in the file of this patent

UNITED STATES PATENTS

| | | |
|---|---|---|
| 2,508,784 | Cox | May 23, 1950 |
| 2,515,550 | Ciba | July 13, 1950 |
| 2,558,678 | Garrett | June 26, 1951 |

FOREIGN PATENTS

| | | |
|---|---|---|
| 614,686 | Germany | June 14, 1935 |